United States Patent
Le

(10) Patent No.: US 7,890,805 B2
(45) Date of Patent: Feb. 15, 2011

(54) REGRESSION TESTING OF A PRINTING SYSTEM

(75) Inventor: Loc T. Le, San Jose, CA (US)

(73) Assignee: Ricoh Company, Ltd, Tokyo (JP)

( * ) Notice: Subject to any disclaimer, the term of this patent is extended or adjusted under 35 U.S.C. 154(b) by 253 days.

(21) Appl. No.: 12/327,061

(22) Filed: Dec. 3, 2008

(65) Prior Publication Data

US 2010/0138697 A1 Jun. 3, 2010

(51) Int. Cl.
*G06F 11/00* (2006.01)
(52) U.S. Cl. ............................................. 714/37
(58) Field of Classification Search ............. 714/18–21, 714/25–28, 30–39, 43–46, 48–51, 57
See application file for complete search history.

(56) References Cited

U.S. PATENT DOCUMENTS

| | | | |
|---|---|---|---|
| 6,490,696 B1 * | 12/2002 | Wood et al. | 714/38 |
| 6,763,482 B2 * | 7/2004 | Bernklau-halvor | 714/25 |
| 7,062,402 B2 | 6/2006 | Ternasky et al. | |
| 7,096,143 B2 | 8/2006 | Ternasky et al. | |
| 7,168,003 B2 | 1/2007 | Lozano et al. | |
| 7,169,003 B2 | 1/2007 | Iwase et al. | |
| 7,620,939 B2 * | 11/2009 | Jakubiak | 717/124 |
| 7,702,958 B2 * | 4/2010 | Kwong et al. | 714/38 |
| 2006/0225048 A1 * | 10/2006 | Jakubiak | 717/127 |

* cited by examiner

*Primary Examiner*—Nadeem Iqbal
(74) *Attorney, Agent, or Firm*—Duft Bornsen & Fishman, LLP

(57) ABSTRACT

A standard input for a regression test is processed in a printing system in a first (standard) configuration to generate a standard output. The standard output may include a standard PDL output and a standard bitmap. The standard input is processed in the printing system in a second configuration to be tested to generate regression test output. The regression test output may include a test PDL output and test bitmap. The regression test output and the standard output are compared to determine if changes included in the second configuration of the printing system produce an undesirable effect. Each standard input and corresponding standard output is identified by a unique test identifier and is stored.

19 Claims, 4 Drawing Sheets

REGRESSION TESTING OF A PRINTING SYSTEM

BACKGROUND

1. Field of the Invention

The invention relates to the field of printing systems, and in particular, to regression testing of printing systems.

2. Discussion of Related Art

The design, manufacture and utilization of printers and printing systems are continually changing. New features implemented in hardware and software for printing systems are being developed to improve the performance of printing systems and to lower costs. During the design and development of new printing systems, and of improvements in existing systems, engineers and scientists must frequently test the effects of new changes on printer output. A diagnostic and quality control method known as regression testing is used to compare outputs from various combinations of hardware and software to determine if a change in an element of the system causes an undesirable change in output of the system. If an undesirable change in the output occurs, the identified error may be used by designers to modify their particular hardware or software to eliminate the undesirable change in system output. Unfortunately, identifying the source or cause of the change in output can be difficult, given the innumerable dependencies between the hardware and software elements of a printing system.

Generally, when a particular type of change is introduced in either software or hardware of the printing system, a single test of the printing system is insufficient to test all the possible effects of the change on printer output. Instead, a collection of various tests, often referred to as a suite of tests, is utilized in regression testing a printing system to test comprehensively the effect of a change. Typically, certain tests are used to test some types of changes, and other tests are used to test other types of changes. Since there are many different possible types of changes that can be made in the hardware and software of a printing system, many different tests must be available to designers to test the effects of the changes.

Regression testing a printing system is further complicated by the task of analyzing output to determine whether undesirable changes have occurred. In any given regression test, a given input to a given printing system is supposed to produce a given expected output. If processing of the given input in a changed printing system produces the expected (standard) output, then the printing system has passed that particular regression test. If the output is different from the expected output, however, then the printing system has failed the regression test. Regression testing a printing system is further complicated, therefore, by the task of analyzing output to determine whether undesirable changes have occurred relative to the expected output. The task of analysis is not always straightforward or easy. Traditionally, output of a printing system being tested is visually compared with a desired standard output produced by an unchanged system. Visual analysis, however, is both tedious and somewhat subjective, making it prone to inaccuracy and unreliability.

Thus, improved techniques are needed to perform efficient regression testing of printing systems, especially during design and development of complex printing systems when many different elements are being changed and tested.

SUMMARY OF THE INVENTION

Embodiments of the present invention help to solve some of the problems described above by providing systems and methods in which a standard input is processed in a first (standard) configuration of a printing system to generate a standard output, and then the standard output is processed in a second (changed) configuration of the printing system to generate a regression test output. The standard output and regression test output are automatically compared to determine if one or more changes in the printing system have caused undesirable effects in system performance.

An exemplary embodiment of a method in accordance with an embodiment of the invention for regression testing a printing system comprises: processing in a first printing-system configuration a standard input to generate a preliminary standard output, the preliminary standard output comprising a preliminary page description language (PDL) output and a preliminary standard bitmap. The exemplary method further includes verifying a desired feature in the preliminary standard output. The standard output comprises a standard PDL output and a standard bitmap. The exemplary method further includes processing the standard input in a second printing-system configuration to generate a regression test output. The regression test output may comprise a test PDL output and a test bitmap. The exemplary method further comprises comparing the regression test output and the standard output to generate comparison results. Typically, the exemplary method further comprises outputting the comparison results.

In some embodiments, verifying a desired feature in the preliminary standard output comprises: sending the preliminary standard bitmap to a marking device; marking a sheet to generate a marked sheet; and examining the marked sheet to verify the desired feature. As used herein a "marking device" may be any suitable device to imprint the generated bitmaps on printable media such as paper. Marking devices may include, for example, ink-jet marking engines and electrophotographic marking engines. Further, marking engines may include cut sheet marking engines that manipulate and mark cut sheets of printable media and continuous form marking engines that manipulate a continuous feed of printable media and may also include finishing devices to cut, fold, staple, etc the final printed output. Some embodiments further comprise assigning a unique test identifier to identify the standard input and the standard output, storing the standard input and standard output identified by the unique test identifier; and requesting a regression test identified by the unique test identifier, thereby invoking the steps of processing the standard input in a second printing-system configuration and of comparing the regression test output and the standard output. Some embodiments further comprise: repeating the steps of processing a standard input (i.e., processing at least one additional (different) standard input) to generate a corresponding preliminary standard input; verifying a desired feature in the preliminary standard input to generate a standard output; processing in a second printing-system configuration the standard input to generate a regression test output; and comparing the regression test output and the standard output to generate comparison results. Some embodiments further comprise: assigning a unique test identifier to identify each of the resulting plurality of standard inputs and corresponding standard outputs; and storing the plurality of standard inputs and corresponding standard outputs identified by unique test identifiers. Thus, some embodiments further comprise: requesting a plurality of regression tests, each test identified by a unique test identifier, thereby invoking for each regression test the steps of automatically processing standard input in a second printing-system configuration and of automatically comparing regression test output and standard output. In some embodiments, standard PDL output comprises standard PostScript output, and test PDL output comprises test PostScript output.

Some embodiments of the method in accordance with an embodiment of the invention comprise: processing a plurality of standard inputs to generate a plurality of corresponding preliminary standard outputs, each preliminary standard output comprising a preliminary PDL output and a preliminary standard bitmap; verifying a desired property in each of a plurality of the preliminary standard outputs, thereby generating a plurality of standard outputs; assigning a unique test identifier to identify each of a plurality of the standard inputs and corresponding standard outputs; storing the plurality of standard inputs and corresponding standard outputs identified by unique test identifiers; requesting a plurality of regression tests, each test identified by a unique test identifier, thereby invoking: processing in the second printing-system configuration a plurality of the standard inputs corresponding to the regression tests to generate a plurality of corresponding regression test outputs. The regression test outputs comprise a test PDL output and a test bitmap file; comparing the regression test outputs and the standard outputs to generate comparison results; and outputting the comparison results.

An exemplary embodiment of a system in accordance with an embodiment of the invention for regression testing a printing system comprises a storage device that is operable to store a standard input, operable to provide the standard input to a print controller of a printing system, and operable to store a corresponding standard output generated by processing the standard input using the print controller in a first printing-system configuration. The exemplary embodiment further includes a comparator that is operable to receive a regression test output generated by processing the standard input using a print controller of the printing system in a second printing-system configuration, operable to compare the regression test output with the standard output, and operable to generate comparison results. The exemplary embodiment further includes a test controller that is operable to receive a test request from a test operator, operable to invoke transmission of the standard input to a print controller of the printing system in the second printing-system configuration in accordance with the test request, operable to invoke transmission of the corresponding regression test output to the comparator, and operable to output comparison results to a test operator. Generally, the standard input comprises standard print content, the standard output comprises a standard page description language (PDL) output and a standard bitmap, and the regression test output comprises a test PDL output and a test bitmap. In some embodiments, the test controller is further operable to assign a unique test identifier to the standard input and the standard output, and to accept a request for a regression test identified by the unique test identifier; and to invoke transmission of the standard input identified by the unique test identifier to a print controller of the printing system in the second printing-system configuration.

An exemplary computer readable medium in accordance with an embodiment of the invention embodies programmed instructions that, when executed by a computer, perform a method for regression testing a printing system.

The invention may include other exemplary embodiments described below.

BRIEF DESCRIPTION OF THE DRAWINGS

The same reference number represents the same element or same type of element on all drawings.

DETAILED DESCRIPTION OF THE DRAWINGS

FIGS. 1-5 and the following description disclose specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will further appreciate that the features described below can be combined in various ways to form multiple variations of the present invention. As a result, the invention is not limited to the specific embodiments described below, but only by the claims and their equivalents.

Figure 1:
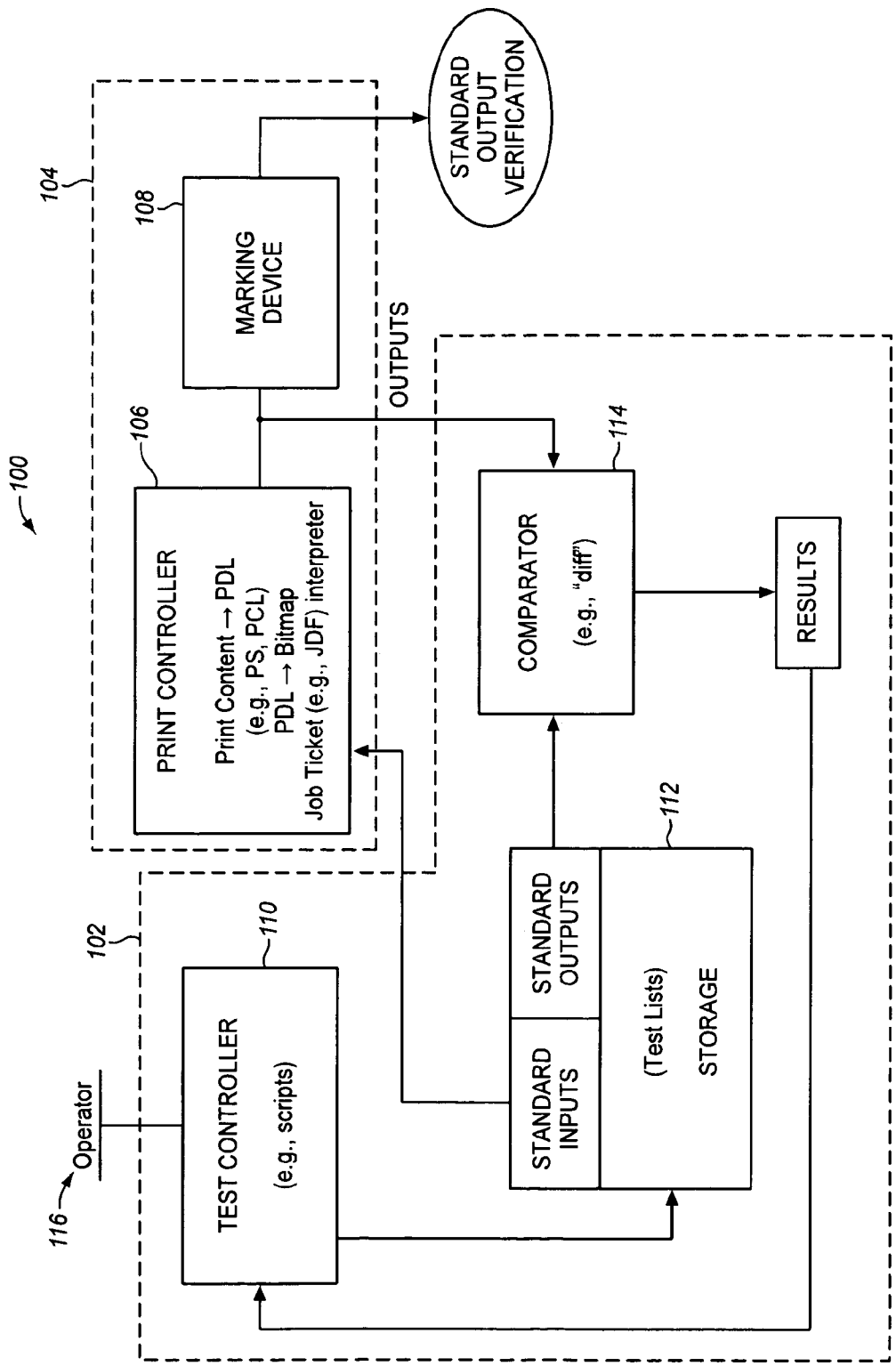
FIG. 1 depicts schematically an exemplary printing environment comprising a regression test system in accordance with an embodiment of the invention for regression testing a printing system.

FIG. 1 depicts schematically an exemplary printing environment 100 in accordance with an embodiment of the invention comprising a regression test system 102 in accordance with an embodiment of the invention for regression testing a printing system. Printing environment 100 further includes a printing system 104 comprising print controller 106 and marking device 108. One of ordinary skill in the art will understand that a printing system, such as printing system 104, may include other elements not depicted in FIG. 1. Regression test system 102 comprises a test controller 110, a storage device 112 and a comparator 114. Storage device 112 is operable to store a standard input and to provide the standard input to print controller 106 of printing system 104. Storage device 112 is further operable to store a corresponding standard output generated by processing the standard input using the print controller in a first printing-system configuration of printing system 104.

The word "standard" is used in this specification to refer to an input that serves as the input to a printing system during regression testing of the printing system. The word "standard" is also used to refer to an output that is used as a comparison standard during regression testing of the printing system. As is known by one of ordinary skill in the art, a standard input is processed in a first, standard configuration of a printing system, and an output from the first configuration serves as standard output. For subsequent regression testing of the printing system in a second printing configuration, the standard input serves as input to the second-configuration system, and the output of the second-configuration system is referred to herein as "regression test output". The regression test output is then compared with the standard output to determine if a change in the printing system has caused an undesired change in printing system operation or output.

Comparator 114 is operable to receive a regression test output generated by processing the standard input using a print controller 106 of printing system 104 in a second printing-system configuration. Comparator 114 is further operable to compare the regression test output with the standard output, and operable to generate comparison results. In some embodiments, comparator 114 comprises a "diff" software utility application program or other similar application programs, as known in the art. Test controller 110 is operable to receive a test request from a test operator 116 and to invoke transmission of a standard input to print controller 106 of printing system 104 in a second printing-system configuration in accordance with the test request. Test controller 110 is also operable to invoke transmission of the corresponding regression test output from printing system 104 to comparator 114 and is operable to output comparison results from comparator 114 to test operator 116.

In some embodiments, the standard input comprises standard print content such as a document encoded in the Portable Document Format (PDF), the standard output comprises a standard PDL output and a standard bitmap, and the regression test output comprises a test PDL output and a test bitmap. In an embodiment of test system 102, test controller 110 is further operable to assign a unique test identifier to the standard input and the standard output and to invoke transmission of the standard input identified by the unique test identifier to print controller 106 of printing system 104 in the second printing-system configuration.

As depicted in FIG. 1, outputs of printing system 104 are received (e.g., captured, tapped, snooped, or otherwise intercepted) from an appropriate signal path between print controller 106 and marking device 108 and sent to comparator 114. For example, the bitmap data may be snooped from a scan data interface between the print controller and the marking engine. Or, for example, the print controller may be instrumented in any of various well known manners to extract the bitmap memory contents directly from the print controller prior to it being applied to the scan data interface with the marking engine. These and other design choices for capture of the generated output of the print controller will be apparent to those of ordinary skill in the art.

One of ordinary skill in the art will understand, however, that outputs of various elements of a printing system instead of or in addition to a print controller may be utilized in a regression test. One of ordinary skill in the art will also understand that the functionality of a regression test system in accordance with embodiments of the invention may be implemented using hardware and software implementations different from those described with reference to FIG. 1. In other words, although a regression test system is described and claimed herein with reference to a test controller, a storage device and a comparator, other embodiments having equivalent functionality in accordance with the invention may be implemented. Similarly, a regression test system in accordance with an embodiment of the invention may be utilized for regression testing a printing system having hardware and software different from printing system 104 depicted in FIG. 1. For example, although embodiments of the regression test system are described herein as interacting with print controller 106 of printing system 104, one of ordinary skill in the art will understand that a regression test system may interact in accordance with an embodiment of the invention with a printing system in a variety of ways not explicitly described and claimed herein. For example, this specification describes a test controller operable to transmit standard input to a print controller in a printing system, even though a more detailed description might describe standard input being transmitted to a print server of a printing system. Also, the term "print controller" is used very broadly in this specification to include a wide variety of functionality of a printing system, which functionality might be designated differently when described in more detail. For example, print controller 106 is described herein as including the functionality of translating print content of a standard input into standard PDL, and of interpreting PDL to generate a bitmap. One of ordinary skill in the art will understand that such functionality may be performed equivalently using many different combinations of hardware and software not described in detail herein.

One of ordinary skill in the art will understand that a printing system 104 in a second printing configuration includes one or more software elements or hardware elements that differentiate it from printing system 104 in a prior, first (standard) printing configuration. For example, print controller 106 of printing system 104 in a second printing configuration may be different from print controller 106 in a first, standard printing configuration. For the sake of clarity, in this specification, the reference numerals of elements of a printing system in a first configuration are used to refer to the same or similar elements of the printing system in a second configuration, but one of ordinary skill in the art will understand from the context that elements in the second configuration may include changes with respect to the first configuration.

Embodiments of a regression test system 102 in accordance with the invention are operable to store a plurality of standard inputs and to perform regression testing of a printing system using a plurality of regression tests. Accordingly, in some embodiments, storage device 112 is operable to store a plurality of standard inputs. In some embodiments, storage device 112 is operable to provide the plurality of standard inputs to print controller 106 of printing system 104, and is operable to store a corresponding plurality of standard outputs generated by processing the plurality of standard inputs using print controller 106 in the first printing-system configuration. In some embodiments, comparator 114 is operable to receive a plurality of regression test outputs generated by processing the plurality of standard inputs using print controller 106 of the printing system in a second printing-system configuration and is operable to compare the plurality of regression test outputs with the plurality of standard outputs. Similarly, in some embodiments, test controller 110 is operable to receive a plurality of test requests from a test operator, operable to invoke transmission of the plurality of standard inputs to print controller 106 of printing system 104 in accordance with the plurality of test requests, operable to invoke transmission of the regression test outputs to comparator 114, and operable to output comparison results to test operator 116. Typically, standard inputs comprise a standard print content, each of the standard outputs comprises a standard PDL output and a standard bitmap, and each of the regression test outputs comprises a test PDL output and a test bitmap.

Accordingly, in some embodiments, test controller 110 is operable to assign a unique test identifier to one or more standard inputs and corresponding standard outputs, and test controller 110 is further operable to invoke transmission of the standard inputs identified by the unique test identifiers to print controller 106 in the second printing-system configuration.

In some exemplary embodiments, the regression test output need not be imprinted on printable medium (e.g., paper). Rather, the generated output (e.g., generated PDL and generated bitmaps) are simply automatically, electronically captured from the printing system in the second configuration without the need to actually imprint the generated page images. This approach reduces consumption of the printable medium thereby reducing wasted media (e.g., wasted paper) and reducing cost incurred for supply of the printable medium for regression test purposes. Further, such an embodiment may improve performance of the regression test process by eliminating the need to wait for the marking engine to actually imprint the generated pages. Rather, the generated regression test output may be electronically captured and compared with the generated standard output without waiting for the marking engine to imprint any page images.

Figure 2:
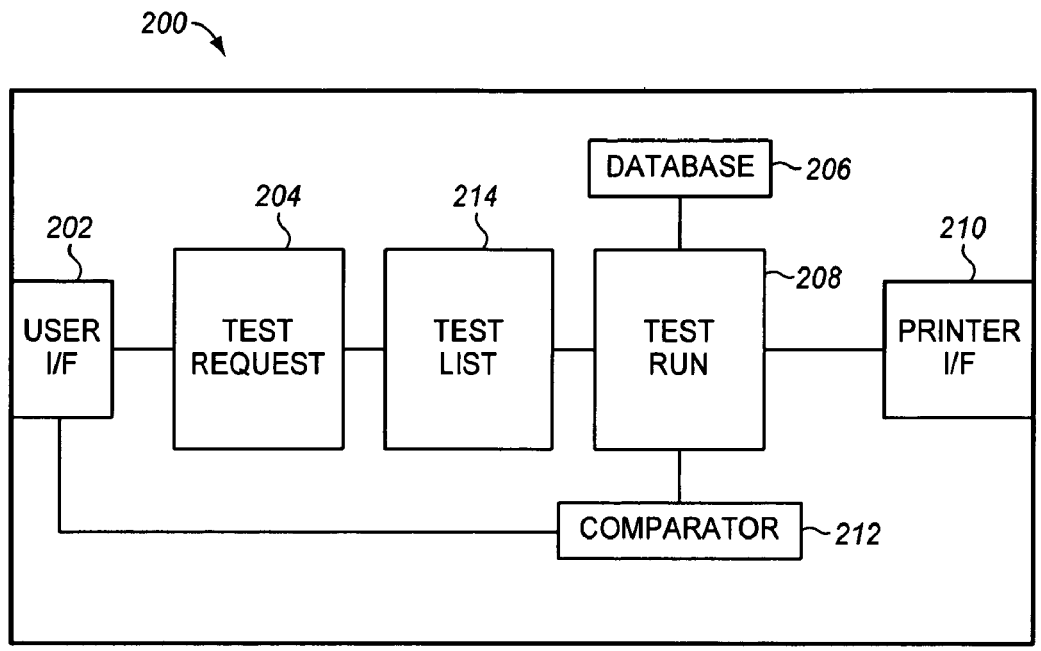
FIG. 2 depicts a diagram of software modules included in an exemplary regression test system in accordance with an embodiment of the invention for regression testing a printing system.

FIG. 2 depicts a diagram 200 of software modules included in an exemplary regression test system 102 in accordance with an embodiment of the invention for regression testing a printing system. User interface 202 includes software operable to interface with a human or an automatic test operator, for example, operator 116 of printing environment 100. Test request software 204 processes test requests received from an operator 116 using techniques known in the art. Database software 206 manages the storage of standard inputs and corresponding standard outputs in a storage device, whereby the standard inputs and outputs may be identified using unique test identifiers. Test run software 208 communicates standard inputs to a printing system (e.g., printing system 104) through printer interface 210 and provides test instructions to print controller 106. Test run software 208 further manages regression test output received from the printing system through printer interface 210 and manages transmission of standard output (from database 206) and regression test output to comparator software 212. In an exemplary embodiment, comparator software 212 comprises the engineering tool known as "diff" or other well known suitable data comparison utility programs. Test list software 214 interacts with test request software 204, test run software 208, and database software 210 to associate standard inputs and standard outputs (e.g., identified by unique test identifiers) with test requests.

Figure 3:
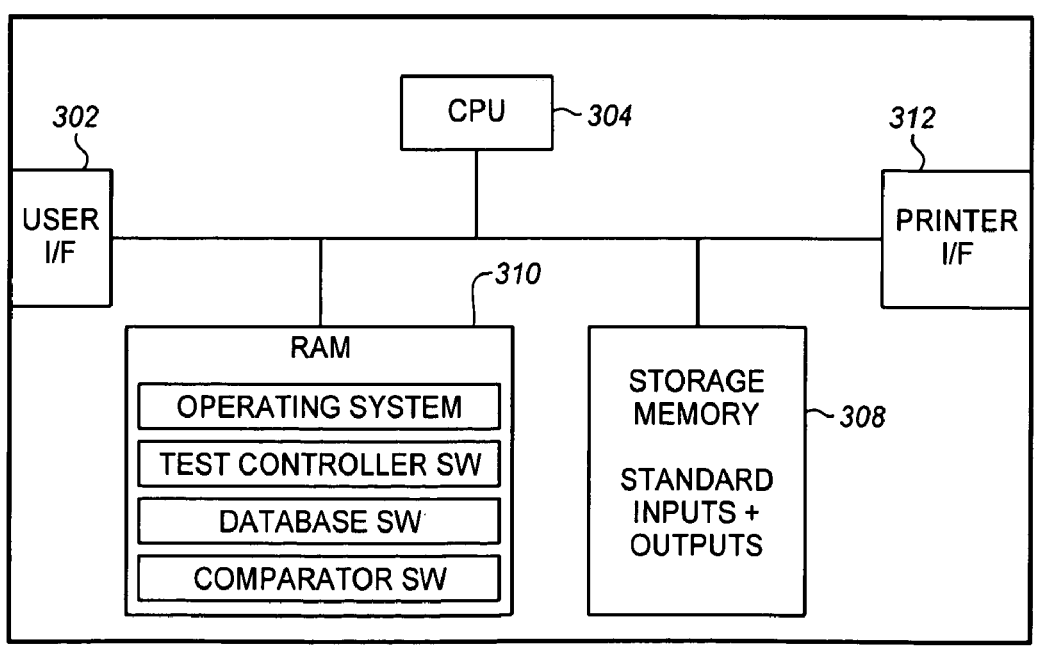
FIG. 3 depicts schematically an exemplary hardware system in accordance with an embodiment of the invention for regression testing a printing system.

FIG. 3 depicts schematically an exemplary hardware system 300 in accordance with an embodiment of the invention for regression testing a printing system. System 300 includes user interface 302 that utilizes interface software 202 to interface with a test operator, for example, with operator 116 of printing environment 100 depicted in FIG. 1. System 300 further includes a central processing unit (CPU) 304, as known in the art. System 300 further includes storage memory 308, as known in the art. Examples of storage memory 308 include a disk drive or other suitable storage for data files. System 300 further includes random access memory (RAM) 310, as known in the art. In some typical embodiments, test request software 204, test list software 214, test run software 208, database software 206, and comparator software 212, discussed with reference to FIG. 2, are stored in storage memory 308. Typically, during operation of system 300 in accordance with embodiments of the invention, test request software 204, test list software 214, test run software 208, database software 206, and comparator software 212 are utilized in RAM 310. In system 300, test request software 204 and test list software 214 are combined in test controller software. System 300 further includes a printer interface 312. In an exemplary embodiment, printer interface 312 is designed using techniques known in the art to interface with printing system 104 using printer interface software 210.

Figure 4:
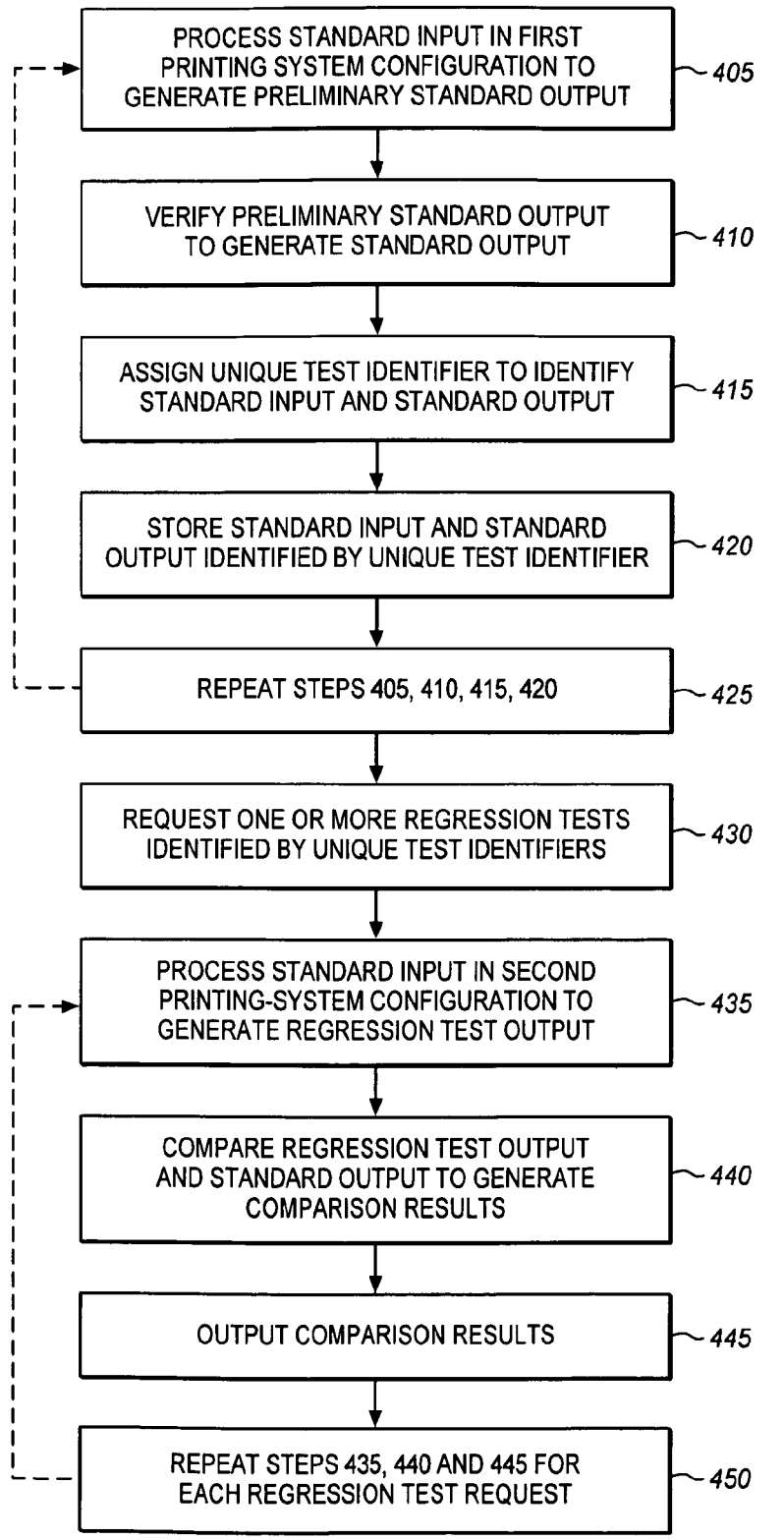
FIG. 4 contains a process flowchart of an exemplary method in accordance with an embodiment of the invention.

FIG. 4 contains a process flowchart of an exemplary method 400 in an embodiment of the invention. Method 400 is described herein with reference to system 102 in printing environment 100, described above with reference to FIG. 1. One of ordinary skill in the art will understand, however, that a method in accordance with embodiments of the invention may be practiced utilizing a system different from system 102 to perform regression testing of printing systems different from that of printing system 104. Also, the functionality of a method in accordance with embodiments of the invention may be implemented using a variety of techniques familiar to those skilled in the art.

Step 405 includes processing standard input in a first printing-system configuration to generate preliminary standard output. In some embodiments, the preliminary standard output comprises a preliminary page description language (PDL) output and a preliminary standard bitmap. Step 410 includes verifying the preliminary standard output, thereby generating standard output comprising a standard PDL output and a standard bitmap. In some embodiments, the standard PDL output comprises a standard PostScript output. In some embodiments, verifying preliminary standard output is performed by verifying the presence of one or more desired features in the output, or verifying the correctness of one or more features in the output. In some embodiments, verifying a desired feature in the preliminary standard output comprises: sending a preliminary standard bitmap to a marking device 108 of the printing system; marking a sheet to generate a marked sheet; and examining the marked sheet to verify one or more desired features.

Step 415 includes assigning a unique test identifier to identify standard input and corresponding standard output. Step 420 includes storing standard input and corresponding standard output in storage device 112, identified by a unique test identifier. The unique identifier may be, for example, a file name using an adopted file naming convention to identify the test standard input, to associate the standard input with corresponding standard output, and to associate the test with a particular printing system or family of printing systems to which the test applies.

Step 425 may include repetition of steps 405, 410, 415 and 420 for a plurality of standard inputs to generate corresponding standard outputs, each pair of standard input and corresponding standard output identified by a unique test identifier. To initiate actual regression testing of the printing system, in step 430, an operator 116 (human or automatic) requests one or more regression tests, each regression test identified by a unique test identifier. Step 435 includes processing a standard input for each regression test in a second printing-system configuration to generate regression test output. Regression test output may comprise a test PDL output and a test bitmap. In some embodiments, test PDL output comprises a test PostScript output.

Step 440 includes comparing the regression test output with the standard output corresponding to the particular regression test to generate comparison results. As noted above, step 440 may include use of well known data comparison utility programs such as "diff" or other suitable data comparison utility programs. In particular, in comparing the test output bitmap, a binary data comparison may be performed to compare, bit by bit, every value of every pixel in the standard output bitmap with the corresponding pixel of the test output bitmap. Where the comparison also includes comparison of the PDL output generated by the printing system in response to receipt of the standard input, the test output PDL is compared to the standard output PDL with some allowance for expected differences. For example, where the printing system generate PostScript or PCL PDL output in response to receipt of the standard input, the generated PostScript or PCL PDL test output may be first stripped of commentary generated within the PDL output. Such commentary is often generated to indicate versions or other information that does not affect the semantic meaning of the output PDL as regards the page image to be imprinted. Step 445 includes outputting comparison results, typically communicating comparison results to operator 116. Some embodiments include step 450, which includes repeating steps 435, 440 and 445 to perform a plurality of requested regressions tests.

Figure 5:
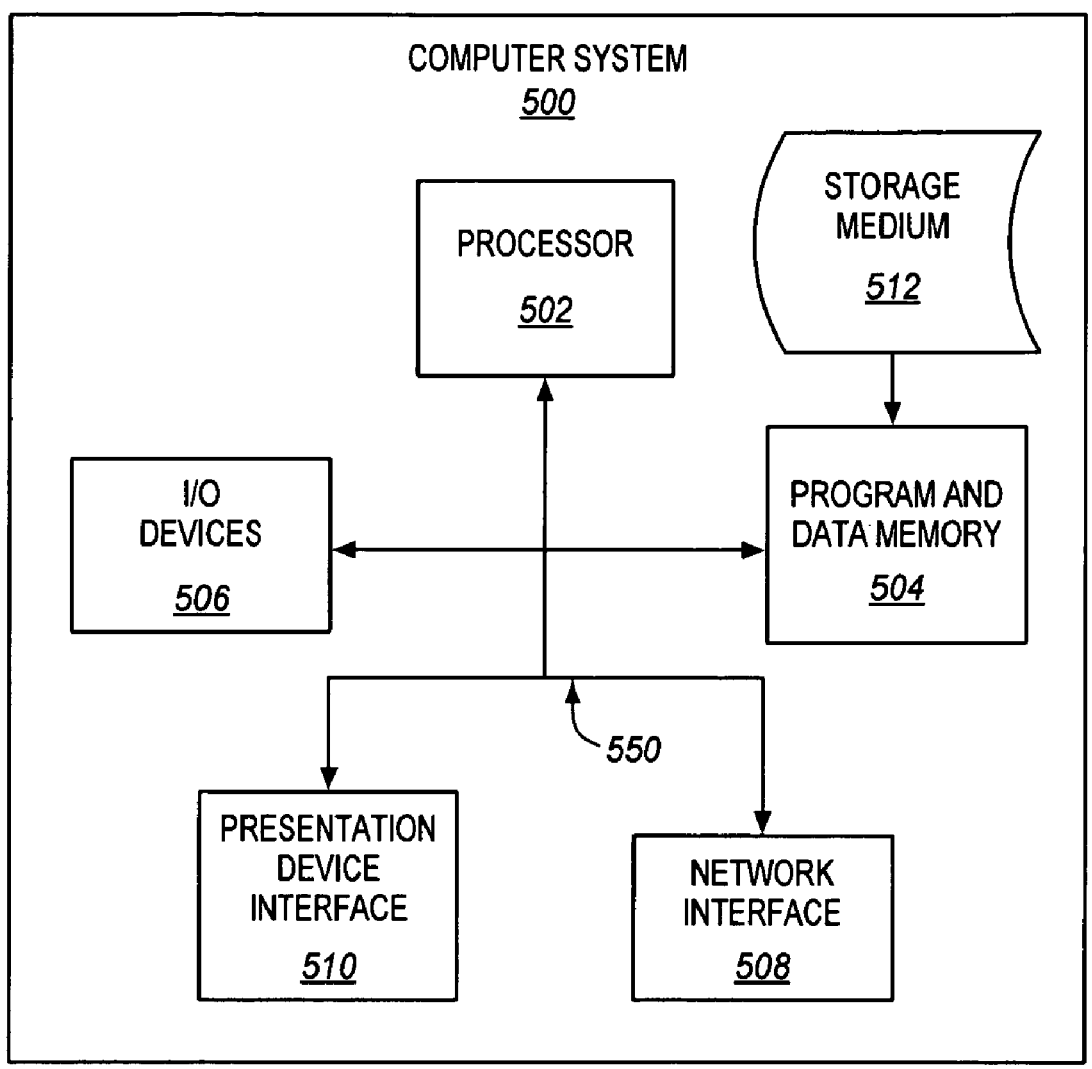
FIG. 5 is a block diagram depicting an exemplary computer system adapted to provide features and aspects of the invention by executing programmed instructions and accessing data stored on a computer readable storage medium.

Embodiments of the invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 5 is a block diagram depicting an automated regression test computer system 500 adapted to provide features and aspects hereof by executing programmed instructions and accessing data stored on a computer readable storage medium 512.

Furthermore, embodiments of the invention can take the form of a computer program product accessible from a computer-usable or computer-readable medium 512 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A computer system 500 suitable for storing and/or executing program code will include at least one processor 502 coupled directly or indirectly to memory elements 504 through a system bus 550. The memory elements 504 can include local memory employed during actual execution of the program code, bulk storage, and cache memories which provide temporary storage of at least some program code in order to reduce the number of times code must be retrieved from bulk storage during execution.

Input/output or I/O devices 506 (including but not limited to keyboards, displays, pointing devices, etc) can be coupled to the system either directly or through intervening I/O controllers. Network adapter interfaces 508 may also be coupled to the system to enable the computer system 500 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 510 may be coupled to the system to interface to one or more presentation device such as printing systems and displays for presentation of presentation data generated by processor 502.

Although specific embodiments were described herein, the scope of the invention is not limited to those specific embodiments. The scope of the invention is defined by the following claims and any equivalents thereof.

I claim:

1. A method of regression testing a printing system, comprising:
processing in a first printing-system configuration a standard input to generate a preliminary standard output, said preliminary standard output comprising a preliminary page description language (PDL) output and a preliminary standard bitmap;
verifying a desired feature in said preliminary standard output, thereby generating standard output comprising a standard PDL output and a standard bitmap;
processing in a second printing-system configuration said standard input to generate a regression test output, said regression test output comprising a test PDL output and a test bitmap;
comparing said regression test output and said standard output to generate comparison results; and
outputting the comparison results.

2. A method of claim 1 wherein said verifying a desired feature in said preliminary standard output comprises:
sending said preliminary standard bitmap to a marking device;
marking a sheet to generate a marked sheet; and
examining said marked sheet to verify said desired feature.

3. A method of claim 1, further comprising:
assigning a unique test identifier to identify said standard input and said standard output;
storing said standard input and standard output identified by said unique test identifier; and
requesting a regression test identified by said unique test identifier, thereby invoking
said steps of processing said standard input in a second printing-system configuration and of comparing said regression test output and said standard output.

4. A method of claim 1, further comprising:
using at least one different standard input, repeating said steps of processing a standard input to generate a preliminary standard input, verifying a desired feature in said preliminary standard input to generate a standard output; processing in a second printing-system configuration said standard input to generate a regression test output, and comparing said regression test output and said standard output to generate comparison results.

5. A method of claim 4, further comprising:
assigning a unique test identifier to identify each of a plurality of standard inputs and corresponding standard outputs;
storing said plurality of standard inputs and corresponding standard outputs identified by unique test identifiers.

6. A method of claim 5, further comprising:
requesting a plurality of regression tests, each test identified by a unique test identifier, thereby invoking for each regression test said steps of processing standard input in a second printing-system configuration and of comparing regression test output and said standard output.

7. A method of claim 1, comprising:
processing a plurality of standard inputs to generate a plurality of corresponding preliminary standard outputs, each preliminary standard output comprising a preliminary PDL output and a preliminary standard bitmap;
verifying a desired property in each of a plurality of said preliminary standard outputs, thereby generating a plurality of standard outputs;
assigning a unique test identifier to identify each of a plurality of said standard inputs and corresponding standard outputs;
storing said plurality of standard inputs and corresponding standard outputs identified by unique test identifiers;
requesting a plurality of regression tests, each test identified by a unique test identifier, thereby invoking:
processing in said second printing-system configuration a plurality of said standard inputs corresponding to said regression tests to generate a plurality of corresponding regression test outputs, said regression test outputs comprising a test PDL output and a test bitmap file;

comparing said regression test outputs and said standard outputs to generate comparison results; and outputting the comparison results.

8. A method of claim 1 wherein:

said standard PDL output comprises a standard PostScript output; and said test PDL output comprises a test PostScript output.

9. A system for regression testing a printing system, comprising:

a storage device, said storage device being operable to store a standard input, operable to provide said standard input to a print controller of a printing system, and operable to store a corresponding standard output generated by processing said standard input using said print controller in a first printing-system configuration;

a comparator, said comparator being operable to receive a regression test output generated by processing said standard input using a print controller of said printing system in a second printing-system configuration, operable to compare said regression test output with said standard output, and operable to generate comparison results; and a test controller, said test controller being operable to receive a test request from a test operator, operable to invoke transmission of said standard input to a print controller of said printing system in said second printing-system configuration in accordance with said test request, operable to invoke transmission of said corresponding regression test output to said comparator, and operable to output comparison results to a test operator;

wherein said standard input comprises standard print content, said standard output comprises a standard page description language (PDL) output and a standard bitmap, and said regression test output comprises a test PDL output and a test bitmap.

10. A system of claim 9 wherein said test controller is further operable:

to assign a unique test identifier to said standard input and said standard output;

to accept a request for a regression test identified by said unique test identifier; and to invoke said transmission of said standard input identified by said unique test identifier to a print controller of said printing system in said second printing-system configuration.

11. A system of claim 9 wherein:

said storage device is operable to store a plurality of standard inputs, operable to provide said plurality of standard inputs to a print controller of said printing system, and operable to store a corresponding plurality of standard outputs generated by processing said plurality of standard inputs using said print controller in said first printing-system configuration;

said comparator is operable to receive a plurality of regression test outputs generated by processing said plurality of standard inputs using a print controller of said printing system in a second printing-system configuration, operable to compare said plurality of regression test outputs with said plurality of standard outputs, and operable to generate comparison results; and said test controller is operable to receive a plurality of test requests from a test operator, operable to invoke transmission of said plurality of standard inputs to a print controller of said printing system in accordance with said plurality of test requests, operable to invoke transmission of said regression test outputs to said comparator, and operable to output comparison results to a test operator;

wherein each of said standard inputs comprise a standard print content, each of said standard outputs comprises a standard PDL output and a standard bitmap, and each of said regression test outputs comprises a test PDL output and a test bitmap.

12. A system of claim 11 wherein said test controller is further operable:

to assign a unique test identifier to a plurality of said standard inputs and said standard outputs; and to invoke said transmission of said standard inputs identified by said unique test identifiers to said print controller in said second printing-system configuration.

13. A computer readable storage medium embodying programmed instructions that, when executed by a computer, performs a method for regression testing a printing system, the method comprising:

processing in a first printing-system configuration a standard input to generate a preliminary standard output, said preliminary standard output comprising preliminary page description language (PDL) output and a preliminary standard bitmap;

verifying a desired feature in said preliminary standard output, thereby generating standard output comprising standard PDL output and a standard bitmap;

processing in a second printing-system configuration said standard input to generate a regression test output, said regression test output comprising test PDL output and a test bitmap;

comparing said regression test output and said standard output to generate comparison results; and outputting the comparison results.

14. A computer readable storage medium of claim 13 wherein said verifying a desired feature in said preliminary standard output comprises:

sending said preliminary standard bitmap to a marking device;

marking a sheet to generate a marked sheet; and examining said marked sheet to verify said desired feature in said marked sheet.

15. A computer readable storage medium of claim 13 wherein said method further comprises:

assigning a unique test identifier to identify said standard input and said standard output;

storing said standard input and standard output identified by said unique test identifier; and requesting a regression test identified by said unique test identifier, thereby invoking said steps of processing said standard input in a second printing-system configuration and of comparing said regression test output and said standard output.

16. A computer readable storage medium of claim 15 wherein said method further comprises:

using at least one different standard input, repeating said steps of processing a standard input to generate a preliminary standard input, verifying a desired feature in said preliminary standard input to generate a standard output; processing in a second printing-system configuration said standard input to generate a regression test output, and comparing said regression test output and said standard output to generate comparison results.

17. A computer readable storage medium of claim 16 wherein said method further comprises:

assigning a unique test identifier to identify each of a plurality of standard inputs and corresponding standard outputs; and storing said plurality of standard inputs and corresponding standard outputs identified by unique test identifiers.

18. A computer readable storage medium of claim 17 wherein said method further comprises:
  requesting a plurality of regression tests, each test identified by a unique test identifier, thereby invoking for each regression test said steps of processing standard input in a second printing-system configuration and of comparing regression test output and said standard output.

19. A computer readable storage medium of claim 13 wherein said method comprises:
  processing a plurality of standard inputs to generate a plurality of corresponding preliminary standard outputs, each preliminary standard output comprising a preliminary PDL output and a preliminary standard bitmap;
  verifying a desired property in each of a plurality of said preliminary standard outputs, thereby generating a plurality of standard outputs;
  assigning a unique test identifier to identify each of a plurality of said standard inputs and corresponding standard outputs;
  storing said plurality of standard inputs and corresponding standard outputs identified by unique test identifiers;
  requesting a plurality of regression tests, each test identified by a unique test identifier, thereby invoking:
  processing in said second printing-system configuration a plurality of said standard inputs corresponding to said regression tests to generate a plurality of corresponding regression test outputs, said regression test outputs comprising a test PDL output and a test bitmap file;
  comparing said regression test outputs and said standard outputs to generate comparison results; and
  outputting the comparison results.

* * * * *